Patented Mar. 5, 1929.

1,704,073

UNITED STATES PATENT OFFICE.

WILLIAM R. BARGER, OF PASADENA, CALIFORNIA, ASSIGNOR TO THE GOVERNMENT AND THE PEOPLE OF THE UNITED STATES OF AMERICA.

PROCESS FOR THE TREATMENT OF FRUIT FOR THE PREVENTION OF DECAY.

No Drawing. Application filed November 14, 1927. Serial No. 233,299.

(GRANTED UNDER THE ACT OF MARCH 3, 1883.)

This application is made under the act of March 3, 1883, chapter 143 (22 Stat. 625) and the invention herein described and claimed may be used by the Government of the United States or any of its officers or employees in the prosecution of work for the Government, or any person in the United States, without payment to me of any royalty thereon.

This invention consists of a process for the treating of fresh fruits, particularly citrus fruits, with a solution of cadmium chloride ($CdCl_2 2H_2O$) in water to prevent decay caused by green and blue molds. In concentration the cadmium chloride may range from one part by weight to four hundred parts of water to two parts by weight to one hundred parts of water. In place of chemically pure cadmium chloride it has been found that commercial cadmium chloride can be used without decreasing the effectiveness of the treatment provided the requisite concentration of cadmium chloride is present.

Treatment of fruit with this solution controls decay caused by *P. digitatum* and *P. italicum* and aids in the control of decays caused by other fungi such as the decays caused by *Pythiacystis citri*, and *Diplodia natalensis*.

The concentration of cadmium chloride to be used depends somewhat upon the vigor of the fruit and the character of injury of the rind. Ordinarily, a concentration of one-half per cent cadmium chloride by weight in water will give adequate control of green and blue mold decay. This compound is particularly efficient in controlling green mold decay caused by *Penicillium digitatum*.

The material as ordinarily procured is put directly into the water in the treating tank or may be dissolved separately in water before placing it in the tank. I do not desire to limit the temperature of the treating solution to any set temperature as various temperatures from 60° F. upward have proven effective. Neither do I desire to limit the time required for the treatment as good results have been obtained in the control of these fungi with treatment of three minutes duration while treatments up to eight or even ten minutes on tender fruit do not necessarily injure the fruit. For young and vigorous fruit a thorough wetting of the rind which can be done in two or three minutes is sufficient to give effective control of blue and green mold decay while overripe or old fruit may require as much as ten minutes to render the rind resistant to the fungi. The treatment above described is accomplished by spraying, submerging, immersing, or causing the fruit to pass through a receptacle or tank containing the solution of cadmium chloride in such a manner that the entire surface of the fruit is wet with the solution. The apparatus described by Barger, Hukill and Hawkins in United States Patent No. 1,559,733 may be used for this purpose. The treating solution may be applied to the fruit immediately prior to the time of washing, during the washing process, or as a treatment on clean fruit without the other washing. The fruit may be sprayed as it leaves the treating solution with water or a dilute solution of cadmium chloride to remove excessive deposits of the salt without lessening the effectiveness of the treatment.

I claim:

A process of treating fresh fruit, especially citrus fruit, with a solution of cadmium chloride in proportions of one part by weight to two hundred parts of water up to four parts by weight to one hundred parts of water to prevent decay in such fruit caused by *Penicillium digitatum* and *Penicillium italicum*.

WILLIAM R. BARGER.